2,915,439

MICROBIOLOGICAL OXIDATION OF PREGNENOLONE TO PROGESTERONE

David Perlman, Princeton, N.J., assignor to Olin Mathieson Chemical Corporation, New York, N.Y., a corporation of Virginia No Drawing. Continuation of application Serial No. 249,387, October 2, 1951. This application November 29, 1957, Serial No. 699,512

6 Claims. (Cl. 195—51)

This application is a continuation of my parent application Serial No. 249,387, filed October 2, 1951, now abandoned.

This invention relates to a biosynthetic method for the preparation of progesterone, involving controlled oxidation by means of the enzymes of Streptomyces (actinomycetes).

More specifically, the process of the invention involves the microbiological oxidation of pregnenolone to progesterone by means of these microorganisms, some of which simultaneously produce recoverable antibiotics and/or other medicinals as cobalamines (e.g. vitamin $B_{12}$)—especially when the culture medium is supplemented with assimilable cobalt. The microbiological oxidation may be effected by either (1) including pregnenolone in an aerobic culture of the microorganism, or (2) bringing together, in an aqueous medium, pregnenolone, air and enzymes of non-proliferating cells of the microorganism.

As the culture medium there may be employed any nutrient medium suitable for the propagation of the microorganism, such media essentially comprising an assimilable source of carbon and energy, and a source of nitrogenous and growth-promoting factors. The sources of nitrogeneous and growth-promoting factors may be those normally used in fermentations with these microorganisms. Thus, they may be natural organics (e.g., soybean meal, corn-steep liquor, meat extract and/or distillers solubles), or synthetics, such as nitrates, ureas and ammonium compounds. The sources of carbon and energy may be (1) fats, (2) fat acids having at least 14 carbon atoms, (3) carbohydrates, or (4) mixtures of the above-mentioned materials. Among the utilizable fats are lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein and trilaurin. Stearic, palmitic, oleic, linoleic and myristic acids exemplify the utlizable fat acids, while the utilizable carbohydrate sources include such products as starch, sucrose, glucose, maltose, dextrose or impure compositions containing them. Since it is desired that the pregnenolone used to be converted to pregesterone rather than utilized by the microorganism as a source of carbon and energy, the caloric requirements of the microorganism should be adequately supplied by the other sources of carbon and energy mentioned.

Streptomyces generally may be employed as the source of enzymes for the process of the invention. Among the utilizable Streptomyces are Streptomyces species ATCC 11,009 (cf. application Ser. No. 239,018, filed July 27, 1951, now Patent No. 2,709,705, granted May 31, 1955), Streptomyces aureofaciens, Streptomyces griseus, Streptomyces fradiae, Streptomyces lavendulae, Streptomyces venezuelae, Streptomyces olivaceous and Streptomyces rimosus. Streptomyces species ATCC 11,009 has now been identified as a new species of Streptomyces and has been assigned the name Streptomyces argenteolus (see Patent No. 2,855,343, granted October 7, 1958 to Fried et al.).

In addition to pregnenolone, the mida used in the process of the invention may include additional precursors and/or adjuvants to obtain or enhance the production of valuable products. For example, an assimilable source of cobalt (e.g. cobalt nitrate) may be added where cobalamines (e.g. vitamin $B_{12}$) is desired.

An adequate sterile-air supply should be maintained during fermentation, for example by the conventional methods of (1) exposing a large surface of the medium to air or (2) utilizing submerged, aerated culture.

Relatively short periods of enzyme action (e.g. fermentation) are required for conversion to progesterone, the optimum time being determined simply from the progesterone titer of the medium and generally being not more than about 48 hours. On extending the period of enzyme action beyond this optimum time, the progesterone formed is converted to further oxidation products. The progesterone obtained by the process of this invention may be employed, without further purification, for the production of 16α-hydroxyprogesterone by subjecting it to the action (or further action) of the enzymes of Streptomyces species ATCC 11,009 (cf. Patent No. 2,709,705).

The following specific examples are presented as illustrative—but not limitative—of the invention:

Example 1

An aqueous medium of the following composition is prepared:

| | |
|---|---|
| Soybean meal | g-- 15 |
| Glucose | g-- 10 |
| Soybean oil | g-- 2 |
| Water | liter-- 1 |

One hundred milliliter portions of the medium are distributed in 500 ml. Erlenmeyer flasks, and 20 mg. of pregnenolone is added to each flask. The flasks are then plugged with cotton and sterilized in the usual manner (by autoclaving). When cool, each flask is inoculated with 3 ml. of a vegetative inoculum of Streptomyces aureofaciens (NRRL 2209), grown on a soybean meal-glucose medium. The flasks are then placed on a reciprocating shaker (120 four inch cycles per minute) and agitated thereon at 25° ±1° C. for 2 days. The pH of the whole culture is then adjusted to 3-4 with sulfuric acid, and the solids are removed by centrifugation. The aqueous fraction is then extracted 3 times with an equal volume of chloroform. The chloroform extracts are then pooled, and the solvent is removed by evaporation under vacuum. An almost quantitative yield of progesterone is obtained. The product may be characterized by means of the following procedure: An aliquot is chromatographed on filter paper using a toluene-propylene glycol system [method of Zaffaroni, Science 111: 6 (1950)]. After a one-hour development period, the paper strips are dried and the position of the steroid is spotted using the Zimmermann reaction. The steroid present in a duplicate strip is then eluted with 95% ethanol and examined, using a Beckman spectrophotometer, for a marker absorption maximum at 2400 A.; [cf. method of Samuels et al., Science 113: 490 (1951)].

The following results are obtained when the procedure of this example is repeated with larger quantities of steroid precursor:

| Pregnenolone added to medium, mg./l. | Progesterone found after incubation, mg./l. |
|---|---|
| 400 | 380 |
| 1,000 | 935 |
| 2,000 | 1,900 |

*Examples 2–6*

The procedure of Example 1 is followed except that the *Streptomyces aureofaciens* (NRRL 2209) is replaced by the following other Streptomyces, with the results indicated:

| Example No. | Streptomyces | Progesterone yield, percent (approx.) |
|---|---|---|
| 2 | Streptomyces argenteolus | 95 |
| 3 | Streptomyces griseus (Waksman Culture Collection No. 3478) | 90 |
| 4 | Streptomyces rimosus (NRRL 2234) | 95 |
| 5 | Streptomyces griseus (Waksman Culture Collection No. S. griseus 4) | 95 |
| 6 | Streptomyces fradiae (Waksman Culture Collection No. 3535) | 85 |

*Example 7*

The procedure of Example 1 is followed except that the pregnenolone is added to the growing culture after fermentation has proceeded for one day. An almost quantitative yield of progesterone is obtained.

The following results are obtained when the procedure of Example 7 is repeated with larger quantities of pregnenolone.

| Pregnenolone added to medium, mg./l. | Progesterone found after incubation, mg./l. |
|---|---|
| 2,000 | 1,560 |
| 10,000 | 7,325 |

*Examples 8 and 9*

The procedure of Example 7 is followed except that the *Streptomyces aureofaciens* is replaced by the following other Streptomyces, with the results indicated:

| Example No. | Streptomyces | Progesterone yield, percent (approx.) |
|---|---|---|
| 8 | Streptomyces argenteolus | 95 |
| 9 | Streptomyces griseus (Waksman Culture Collection No. S. griseus 4) | 95 |

*Example 10*

Two-day cultures of *Streptomyces aureofaciens* (NRRL 2209), grown on a soybean meal-glucose medium, are centrifuged, re-suspended in distilled water, recentrifuged and re-suspended in distilled water, to yield a suspension containing 23 mg. of solids per milliliter. Forty-milliliter aliquots of the suspension are distributed in 125 ml. Erlenmeyer flasks and 10 mg of polyoxyethylene sorbitan monostearate (Tween 60) is then added to the contents of each flask. Measured amounts of pregnenolone are then distributed in the flasks which are agitated on reciprocating shakers in a constant temperature room maintained at 25° ±1° C. The progesterone yields obtained with varying concentrations of pregnenolone and with varying periods of enzyme action are indicated in the following tabulation:

| Pregnenolone added, mg./liter | Progesterone yield (mg./l.) after indicated period of enzyme action | | |
|---|---|---|---|
|  | 6 hours | 24 hours | 48 hours |
| 100 | 55 | 95 | 80 |
| 200 | 135 | 190 | 195 |
| 1,000 | 210 | 790 | 910 |

The invention may be variously otherwise embodied within the scope of the appended claims.

What is claimed is:

1. A microbiological process which comprises bringing together, in an aqueous medium, pregnenolone, air and enzymes of a Streptomyces and recovering progesterone therefrom.

2. A microbiological process which comprises cultivating a Streptomyces under aerobic conditions in an aqueous nutrient medium containing pregnenolone, allowing the fermentation to continue until at least a substantial amount of progesterone is formed, and recovering the progesterone therefrom.

3. The process of claim 2 wherein the fermentation is allowed to continue for a period of not more than about 48 hours.

4. The process of claim 2 in which the medium contains, as at least a part of its source of carbon and energy, a member of the group consisting of (1) fat acids containing at least 14 carbon atoms and (2) fats.

5. A microbiological process which comprises bringing together, in an aqueous medium, pregnenolone, air and enzymes of a Streptomyces of the group consisting of *Streptomyces aureofaciens*, *Streptomyces argenteolus*, *Streptomyces griseus*, *Streptomyces rimosus*, *Streptomyces fradiae*, *Streptomyces olivaceous*, *Streptomyces lavendulae* and *Streptomyces venezuelae* and recovering progesterone therefrom.

6. The process of claim 5 in which the medium contains, as at least part of its source of carbon and energy, a member of the group consisting of (1) fat acids containing at least 14 carbon atoms and (2) fats.

References Cited in the file of this patent

UNITED STATES PATENTS

| 2,236,574 | Koester et al. | Apr. 1, 1941 |
| 2,341,110 | Mamoli | Feb. 8, 1944 |
| 2,602,769 | Murray | July 8, 1952 |
| 2,649,401 | Haines et al. | Aug. 18, 1953 |
| 2,649,402 | Murray | Aug. 18, 1953 |
| 2,709,705 | Perlman et al. | May 31, 1955 |

OTHER REFERENCES

Bergey: Manual of Determinative Bacteriology, 6th ed., p. 38.